United States Patent [19]

Powers et al.

[11] 4,252,710

[45] Feb. 24, 1981

[54] STABILIZED SLURRIES OF ISOOLEFIN POLYMERS

[75] Inventors: Kenneth W. Powers, Berkeley Heights; Ralph H. Schatz, Westfield, both of N.J.

[73] Assignee: Exxon Research & Engineering Co., Florham Park, N.J.

[21] Appl. No.: 63,253

[22] Filed: Aug. 2, 1979

[51] Int. Cl.³ .............................................. C08K 5/02
[52] U.S. Cl. ........................................... 260/33.8 UA
[58] Field of Search ................. 260/33.8 UA; 525/76, 525/86

[56] References Cited

U.S. PATENT DOCUMENTS

| | | | |
|---|---|---|---|
| 3,261,788 | 7/1966 | Carter et al. | 260/33.8 UA |
| 3,904,708 | 9/1975 | Kennedy et al. | 260/33.8 UA |
| 4,098,980 | 7/1978 | Markle et al. | 525/94 |

*Primary Examiner*—Lewis T. Jacobs
*Attorney, Agent, or Firm*—John J. Mahon

[57] ABSTRACT

Polymerization slurries of elastomeric isoolefin homopolymers and copolymers, such as butyl rubber, in diluents such as methyl chloride, are effectively stabilized against agglomeration of polymer particles through addition of minor proportions of (i) a preformed copolymer stabilizer having both a lyophobic or lyophilic portion, or (ii) an in situ formed stabilizer from a functional lyophilic stabilizer precursor capable of copolymerizing or otherwise chemically bonding with the polymer product. Agglomeration of polymer products is effectively prevented, yielding a number of significant processing advantages. The process is especially adaptable to the production of isobutylene-isoprene butyl rubber.

34 Claims, No Drawings

12,710

STABILIZED SLURRIES OF ISOOLEFIN POLYMERS

BACKGROUND OF THE INVENTION AND PRIOR ART

This invention relates to the polymerization of elastomeric isoolefinic homopolymers and copolymers, especially the polymerization reaction required to produce the isobutylene-isoprene form of butyl rubber. More particularly, the invention relates to a method of stabilizing against agglomeration the polymerization slurries used in the preparation of such polymers, the medium or diluent of such slurries being methyl chloride or certain other polar chlorinated hydrocarbon diluents.

The term "butyl rubber" as used in the specification and claims means copolymers of $C_4$-$C_7$ isoolefins and $C_4$-$C_{14}$ conjugated dienes which comprise about 0.5 to about 15 mole percent conjugated diene and about 85 to 99.5 mole percent isoolefin. Illustrative examples of the isoolefins which may be used in the preparation of butyl rubber are isobutylene, 2-methyl-1-propene, 3-methyl-1-butene, 4-methyl-1-pentene and $\beta$-pinene. Illustrative examples of conjugated dienes which may be used in the preparation of butyl rubber are isoprene, butadiene, 2,3-dimethyl butadiene, piperylene, 2,5-dimethylhexa-2,4-diene, cyclopentadiene, cyclohexadiene and methylcyclopentadiene. The preparation of butyl rubber is described in U.S. Pat. No. 2,356,128 and is further described in an article by R. M. Thomas et al. in Industrial and Engineering Chemistry, vol. 32, pp. 1283 et seq., October, 1940. Butyl rubber generally has a viscosity average molecular weight between about 100,000 to about 800,000, preferably about 250,000 to about 600,000 and a Wijs Iodine No. of about 0.5 to 50, preferably 1 to 20.

The term isoolefin homopolymers as used herein is meant to encompass those homopolymers of $C_4$-$C_7$ isoolefins particularly polyisobutylene, which have a small degree of terminal unsaturation and certain elastomeric properties. The principal commercial forms of these butyl rubber and isoolefin polymers such as isobutylene-isoprene butyl rubber and polyisobutylene, are prepared in a low temperature cationic polymerization process using Lewis acid type catalysts, typically aluminum chloride being employed. Boron trifluoride is also considered useful in these processes. The process extensively used in industry employs methyl chloride as the diluent for the reaction mixture at very low temperatures, that is less than minus 90° C. Methyl chloride is employed for a variety of reasons, including the fact that it is a solvent for the monomers and aluminum chloride catalyst and a nonsolvent for the polymer product. Also, methyl chloride has suitable freezing and boiling points to permit, respectively, low temperature polymerization and effective separation from the polymer and unreacted monomers.

The slurry polymerization process in methyl chloride offers a number of additional advantages in that a polymer concentration of approximately 30% by weight in the reaction mixture can be achieved, as opposed to the concentration of only about 8% to 12% in solution polymerization. Also, an acceptable relatively low viscosity of the polymerization mass is obtained enabling the heat of polymerization to be removed more effectively by heat exchange. Slurry polymerization processes in methyl chloride are used in the production of high molecular weight polyisobutylene and isobutylene-isoprene butyl rubber polymers.

Notwithstanding the widespread use of the slurry polymerization process in methyl chloride, there are a number of problems in carrying out this process which are related to the tendency of the polymer product particles to agglomerate, and thereby destabilize the slurry dispersion. The rate of agglomeration increases rapidly as reaction temperature approaches −90° C. It is not possible to maintain a stable slurry above −80° C. These agglomerated particles tend to adhere to and to grow and plate out on all surfaces they contact, such as reactor discharge lines, as well as reactor inlet lines and any heat transfer equipment being used to remove the exothermic heat of polymerization, which is critical since low temperature reaction conditions must be maintained.

Heretofore, no effective technique of stabilizing the slurry has been found other than by operation below −80° C. and with high agitation in the reactor. It has become standard practice to design manufacturing facilities with additional reactor equipment so that the reaction process can be cycled between alternate reactor systems so that at any given time one or more reactors are in the process of being cleaned. If a stable slurry could be produced and maintained in a non-fouling condition, substantial economies in equipment installation and process techniques could be achieved. A further limitation imposed by the tendency of the polymer product particles to agglomerate is the inefficiency of heat exchange, which effectively prevents any attempt to heat exchange the cold reactor effluent with the incoming feed in order to realize savings in the refrigeration energy required.

A general reference text which discusses the theory and principles concerning dispersion polymerization and in particular the use of block and graft copolymers as dispersion stabilizers is "Dispersion Polymerization in Organic Media", edited by K. E. J. Barrett, John Wiley & Sons, 1975. While this text, particularly in Chapter 3, discloses the use of block or graft copolymers having an insoluble component, or anchor group, and a diluent-soluble component in a number of dispersion polymerization processes, no disclosure is made of any stabilizer system useful in the methyl chloride slurry polymerization process for isoolefin homopolymers or butyl rubber copolymers as disclosed in accordance with the present invention.

In published Netherlands Application 7707060 (1977), filed in the U.S. on June 14, 1976, as Ser. No. 699,300, now U.S. Pat. No. 4,098,980, issued July 4, 1978, Markle et al disclose a non-aqueous dispersion polymerization process for conjugated diolefins in the presence of a block copolymer dispersion stabilizer, at least one block being soluble in the liquid organic dispersion medium and at least another block being insoluble in the dispersion medium. The Markle et al disclosure deals with the polymerization of a conjugated diolefin monomer in a liquid hydrocarbon dispersion medium such as n-butane, neopentane or mixed isomeric pentanes in the presence of a Ziegler-Natta Catalyst. The conjugated diolefins, particularly preferred by Markle et al, are butadiene-1,3, isoprene and piperylene. Markle et al also disclose mixtures of conjugated diolefins.

The process of the present invention is considered distinguished from the disclosure of Markle et al in that it relates to a cationic polymerization carried out in a polar chlorinated hydrocarbon diluent, such as methyl chloride, utilizing stabilizers which are especially effective in that polymerization process. Markle et al deal with anionic polymerization processes conducted in a non-polar liquid hydrocarbon diluent.

So far as the inventors hereof are aware, no effective method for stabilizing methyl chloride slurries, nor slurries in any type of diluent, used in the production of isoolefin polymer products with chemical additive stabilizers is known or disclosed in the prior art.

In accordance with the present invention, there has been discovered a method of stabilizing a polymerization slurry against agglomeration, the slurry containing an isoolefin homopolymer or a butyl rubber copolymer in a polymerization diluent, the diluent being methyl chloride, methylene chloride, vinyl chloride or ethyl chloride, which comprises incorporating into the reaction mixture which comprises the mixture of monomers, catalyst and diluent, or into the polymerization product slurry about 0.05% to 20% by weight, based upon the weight of product isoolefin homopolymer or product butyl rubber copolymer, of a stabilizing agent, the stabilizing agent being (i) a preformed copolymer having a lyophilic, diluent soluble portion and a lyophobic, diluent insoluble, isoolefin homopolymer or butyl rubber soluble or adsorbable portion, the stabilizing agent being capable of forming an adsorbed solubilized polymer coating around the precipitated isoolefin homopolymer or butyl rubber copolymer to stabilize the slurry, or (ii) an in situ formed stabilizing agent copolymer formed from a stabilizer precursor, the stabilizer precursor being a lyophilic polymer containing a functional group capable of copolymerizing or forming a chemical bond with the isoolefin polymer or butyl rubber copolymer being formed in the main polymerization process, the functional group being a cationically active halogen, either pendant or enchained or cationically active unsaturation, the lyophobic portion of the stabilizing agent being the isoolefin homopolymer or butyl rubber copolymer which is being formed in the main polymerization process, the stabilizing agent so formed being capable of forming an adsorbed solubilized polymer coating around the precipitated product polymer to stabilize the product polymer slurry.

The quantity of stabilizing agent set forth above is expressed as a percent by weight of the product isoolefin homopolymer or butyl rubber copolymer. The exact quantity of stabilizer agent added to the reaction mixture is a function of the exact concentration of the feed blend and the estimated degree of conversion of monomers. In a typical butyl rubber reaction process for manufacturing isobutylene-isoprene butyl rubber, the reactor feed blend which is prepared contains about 25% to 35% by weight monomers, and typically 80% to 90% by weight of monomers are converted to polymer product.

The present invention deals with two forms of suitable stabilizing agents, both of which are effective in the polymerization diluent and serve to stabilize the polymerization slurry comprised of the polymer or copolymer particles which are produced in the basic polymerization reaction. As used herein, the term "polymerization diluent" is meant to refer to methyl chloride, methylene chloride, vinyl chloride and ethyl chloride. Methyl chloride is the preferred diluent in all embodiments of this invention.

Utilization of a preformed block or graft copolymer, which is both lyophilic and lyophobic in the presence of the polymerization diluent, involves first providing a suitable copolymer. Generally, a preformed copolymer stabilizer must have a diluent insoluble anchor portion, which is adsorbable or soluble in polymerized isoolefin or butyl rubber, as well as a diluent soluble portion which functions to keep the adsorbed polymer dispersed in the polymerization diluent.

The preformed block or graft copolymer stabilizer, subject to certain limitations as set forth below, may be added to the reaction mixture and can be present throughout the polymerization reaction to prevent agglomeration at reaction temperatures. Alternatively, a portion of the preformed stabilizer can be added to the reaction mixture and additional stabilizer can be injected into the reactor effluent lines to prevent agglomeration in downstream equipment.

Certain categories of preformed stabilizers, while being effective as slurry stabilizers in the present invention, should only be added upon completion of the polymerization reaction. Thus, they are preferably added to the reactor effluent in order to prevent agglomeration during the final stages of processing. These preformed stabilizer copolymers are defined as those containing a substantial amount of cationically active unsaturation or functional groups, the functional groups being hydroxyl, ester, ketone, amino, aldehyde, nitrile, amido, carboxyl, sulfonate, mercaptan, ether, anhydride, nitro, active allylic or active tertiary halogen. Preformed polymeric stabilizing agents which are predominantly hydrocarbon in nature and are free of cationically active unsaturation and meet the other requirements as described herein can be incorporated into the slurry during the polymerization process itself by being made a component of the reaction mixture.

The lyophilic portion of the preformed copolymer stabilizing agent employed in the present invention must be completely soluble in, or miscible with, the polymerization diluent. A suitable criterion is that the lyophilic portion have a Flory-Huggins interaction parameter with the polymerization diluent of less than 0.5 or a Flory solvency coefficient with the polymerization diluent greater than 1.

Suitable lyophilic polymers which meet these requirements and which do not adversely affect the catalyst or polymerization conditions include polystyrene, polyvinyl chloride, polyvinyl bromide and neoprene, with the preferred lyophilic portion being polystyrene, polyvinyl chloride, or polyvinyl bromide. Also suitable are substituted styrene lyophiles such as mono-, di- and trisubstituted styrenes, the substituents being halogen, such as chlorine, or lower ($C_1$-$C_5$) alkyl groups, as illustrated by alpha-methyl styrene, para-t-butyl-styrene, p-chlorostyrene and similar ring chlorinated styrenes. It is also suitable to employ as the lyophilic portion combinations of two suitable lyophilic polymers such as copolymers of styrene and vinyl chloride. Thus, the term "lyophilic portion" as used herein is meant to encompass a portion composed of one or more monomers which meet the criteria for suitable lyophiles in the practice of the present invention. This lyophilic portion should have a degree of polymerization (D.P.) of at least about 20 and up to about 5,000 or 6,000.

A number of significant factors influence the selection of the lyophobic portion of the stabilizing agent. The lyophobic portion is insoluble in polymerization diluent but should have a high affinity for the product polymer so that it is adsorbed or otherwise bonded onto the polymer particle. A lyophobic portion composed of the same material being produced in the cationic Lewis Acid catalyzed polymerization reaction, such as isobutylene homopolymer or isobutylene-isoprene butyl copolymer, makes an ideal lyophobic portion in the preformed stabilizer agent employed in the present invention. Suitable lyophobic materials generally include diluent insoluble polymers having a solubility parameter less than about 8 and a degree of polymerization (D.P.) of at least about 10. Suitable materials include polyisolefins generally of $C_4$-$C_7$ isoolefins, such as polyisobutylene, butyl rubber copolymers generally, such as isobutylene-isoprene butyl rubber, polybutadiene, polyisoprene, ethylene/propylene copolymers, EPDM terpolymers, hydrogenated diene polymers, e.g. hydrogenated polybutadiene, SBR Rubbers, which are styrene/butadiene random copolymers of low styrene content and polydimethyl silicone. A particularly preferred preformed stabilizer for use in the production of isobutylene-isoprene butyl rubber is a preformed block copolymer stabilizer agent composed of an isobutylene-isoprene portion block or graft with about 20 to 80 weight percent styrene block or graft. Also preferred is a styrene-EPDM preformed stabilizer.

In situ formation of the stabilizer utilizes a lyophilic polymer component having a functional group capable of reacting with the isoolefin or butyl rubber polymer being formed in the main polymerization process. In this embodiment, the polymer being prepared becomes the lyophobic portion of the copolymer stabilizer.

The in situ method of preparing the stabilizer copolymer in the present invention involves first providing a stabilizer precursor which is a lyophilic polymer having a functional group capable of copolymerizing or otherwise reacting with the isoolefin polymer, e.g. polyisobutylene or isobutylene-isoprene, being formed in the main polymerization reaction to form the block or graft copolymer stabilizer in accordance with the present invention. The functional groups may be cationically active pendant or enchained halogen, preferably chlorine, or cationically active unsaturation.

Formation of these stabilizer precursors may be accomplished through free radical polymerization of a lyophile such as styrene in the presence of carbon tetrachloride or by free radical copolymerization of a lyophile such as styrene with vinyl benzyl chloride. These stabilizer precursors will contain active halogen which lead to in situ formation of the stabilizer copolymer in the present invention through a chain transfer or co-initiation reaction mechanism.

Formation of a stabilizer precursor containing cationically active unsaturation as the functional group in the lyophile can be accomplished by anionically polymerizing a lyophile such as styrene and capping it with vinyl benzyl chloride or methallyl chloride whereby the residue of this vinyl benzyl chloride or methallyl chloride yields cationically active unsaturation. This stabilizer precursor then forms the stabilizer copolymer of the present invention by copolymerizing with the isoolefin polymer or butyl rubber copolymer being formed in the main polymerization reaction.

The above embodiments may be illustrated by first considering lyophilic polystyrenes having a reactive chlorine as an end group:

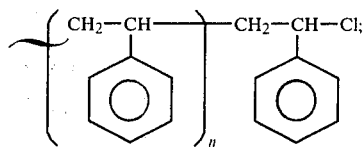

or an active enchained chlorine pendant to a styrene polymer chain

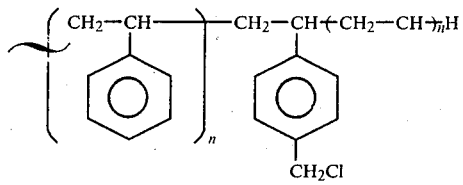

Lyophilic polystyrene stabilizer precursors represented above containing terminal or enchained active chlorine can be prepared, respectively by polymerizing styrene using free radical catalysts in the presence of carbon tetrachloride which acts as a transfer agent to yield a chlorine capped polystyrene and by copolymerizing styrene with a minor amount of vinyl benzyl chloride to form a polystyrene containing enchained vinyl benzyl chloride.

These lyophilic portions containing an active halogen will incorporate polystyrene into a polyisolefin or butyl rubber copolymer chain by a transfer mechanism or co-initiation mechanism. Chain transfer is best illustrated by reference to an isobutylene polymerization. In this reaction a growing isobutylene carbonium ion abstracts the active halogen as a $Cl^{\ominus}$ from the lyophilic polystyrene to yield a $Cl^{\ominus}$ capped polyisobutylene chain and a polystyryl carbonium ion which, in the presence of isobutylene monomer, propagates to form a stabilizer block copolymer consisting of a polystyrene chain attached to an isobutylene chain. A graft copolymer can also be formed and in the present invention the term stabilizer copolymer or stabilizer polymer may include blocks, grafts, mixtures thereof or other configurations resulting from copolymerization reactions. The same mechanism would apply to utilization in isobutylene-isoprene polymerization. The mechanism is illustrated for reaction with polyisobutylene by the following equations:

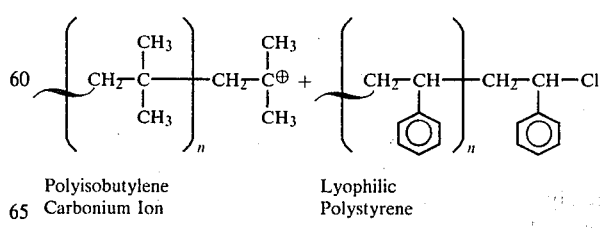

Polyisobutylene Carbonium Ion    Lyophilic Polystyrene

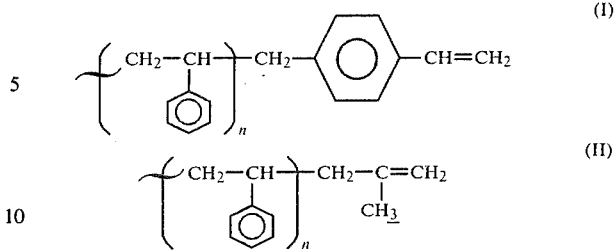

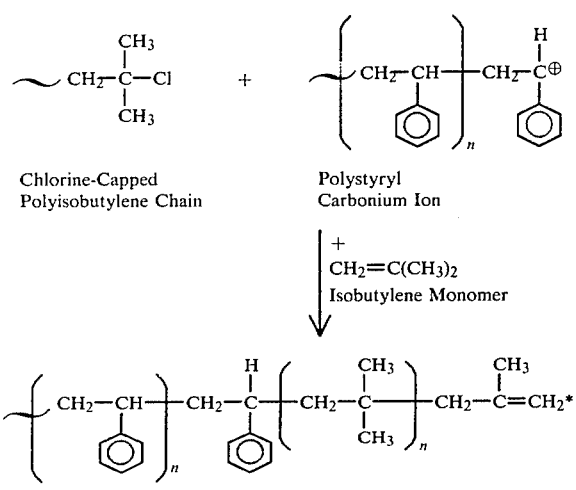

Copolymer Stabilizer

*Where the end group depends upon reaction conditions and may be other than that shown above.

Co-initiation may be illustrated with reference to the following equations showing the AlCl$_3$ polymerization of isobutylene where the stabilizer precursor is a chlorine-containing polystyrene.

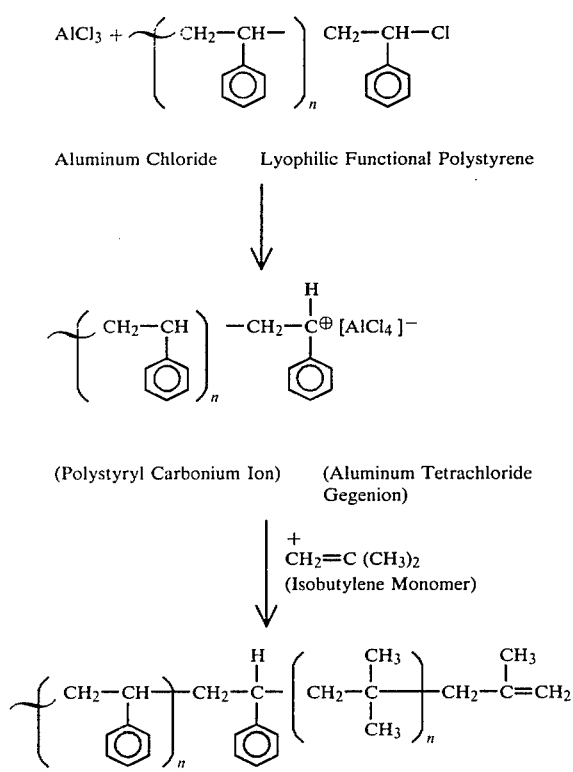

Stabilization of the polymerization slurry can be accomplished utilizing as the stabilizer precursor an anionically polymerized lyophile, such as polystyrene, capped with the residue of vinyl benzyl chloride molecule or a methallyl chloride molecule represented respectively by formulas I and II below:

$\eta$ being an integer such that the $\overline{Mn}$ of the polystyrene chain is about 25,000 to 75,000.

In this embodiment of the present invention, the functional lyophile as illustrated by polystyrene is capable of copolymerizing with isoolefin through the residue of the vinyl benzyl or methallyl unit, which contains cationically active unsaturation. Stabilization is effected by linking the diluent soluble polymer chain to the isoolefin polymer or butyl rubber copolymer as it is formed in the polymerization process. A vinyl benzyl chloride capped polystyrene is especially preferred in the stabilization of methyl chloride slurries containing isobutylene-isoprene butyl rubber copolymer and this stabilizing agent is prepared by anionically polymerizing styrene to a molecular weight of 25,000 to 75,000 in the presence of n-butyl lithium catalyst and then adding vinyl benzyl chloride to cap the living polystyrene chain and precipitate lithium chloride to form the stabilizing agent set forth in formula I above.

Employment of a stabilizer precursor comprising the diluent soluble polymer with a functional group being capable of forming a covalent chemical bond with the isoolefin unit in the polymer product, that is, with isoolefin homopolymer or with the isoolefin portion of butyl rubber copolymer, means that the insoluble or lyophobic portion is not formed until the stabilizer precursor becomes attached to an isoolefin unit during polymerization. Thus the stabilizing molecule is formed in situ during the polymerization process. Selection of the lyophilic portion is governed by the same considerations, including the degree of polymerization values, described above when the preformed block copolymer stabilizing agent is used. Thus, suitable polymerization diluent soluble polymers include polystyrene, polyvinyl chloride, polyvinyl bromide, neoprene and the substituted styrenes as described hereinabove, with polystyrene being particularly preferred.

In using this stabilizing method, it is important that the functional group be active under the cationic polymerization conditions and that the stabilizing agent and functional group not interfere with any aspect of the basic polymerization process. In contrast, when the preformed copolymer is used, its effectiveness is not dependent upon in situ completion of the formation of the stabilization agent.

Suitable lyophilic polystyrenes with functional groups capable of bonding with the product polymer and especially with an isobutylene unit in preparation of polyisobutylene homopolymer or isobutylene-isoprene butyl rubber copolymer are those functional polystyrenes having a number average ($\overline{Mn}$) molecular weight in the range of about 5,000 to 150,000 and preferably in the range of about 25,000 to 75,000.

The process of the present invention offers a number of significant advantages resulting from the achievement of a stabilized butyl rubber slurry. These include elimination of reactor equipment fouling and plugging, the ability to operate at higher slurry concentrations, increased reactor production rates, the capability of refrigeration recovery by heat exchange of reactor effluent with incoming reactor feed, increased reactor run length time as well as the ability to polymerize at warmer reactor temperatures.

A further embodiment of the present invention comprises the stabilized slurries of isoolefin homopolymer or butyl rubber copolymer prepared in accordance with the present invention containing up to about 50% by weight isoolefin homopolymer or butyl rubber copolymer, particularly a stabilized slurry of isobutylene-isoprene butyl rubber in methyl chloride, said slurry containing up to about 50% by weight butyl rubber, or a slurry containing up to about 50% by weight polyisobutylene.

A further embodiment of the present invention is a novel method of preparing non-agglomerating homopolymers of $C_4$-$C_7$ isoolefins and butyl rubber copolymers by polymerizing the corresponding monomers at temperatures from about $-90°$ C. to about $-20°$ C. in the presence of a Lewis Acid cationic polymerization catalyst in a polymerization diluent selected from the group consisting of methyl chloride, methylene chloride, vinyl chloride and ethyl chloride in the presence of a stabilizer, the stabilizer being either (i) a preformed copolymer having a lyophilic, diluent soluble portion and a lyophobic diluent insoluble but isoolefin or butyl rubber soluble or adsorbable portion or (ii) an in situ formed stabilizer copolymer formed from a stabilizer precursor which is incorporated into the reaction mixture, the stabilizer precursor being a lyophilic polymer containing a functional group capable of copolymerizing or otherwise reacting with the isoolefin or butyl rubber copolymer being formed in the main polymerization process, the functional group being a cationically active pendant or enchained halogen or cationically active unsaturation, the lyophobic portion of the stabilizing agent being the isoolefin or butyl rubber polymer formed in the main polymerization process.

A particular point of novelty is the capability to form non-agglomerating isoolefin homopolymer or butyl rubber copolymer at temperatures of from about $-90°$ C. to $-20°$ C. utilizing $AlCl_3$ as well as other cationic Lewis Acid polymerization catalysts such as aluminum alkyls, as exemplified by aluminum ethyldichloride, $TiCl_4$, $BF_3$, $SnCl_4$, $AlBr_3$ and other Friedel-Crafts catalysts.

A particularly preferred embodiment of the present invention resides in the preparation of non-agglomerating isobutylene-isoprene butyl rubber by cationic polymerization of the corresponding monomers at temperatures of from about $-90°$ C. to $-20°$ C. utilizing as the catalyst $AlCl_3$ or aluminum ethyl dichloride in methyl chloride, methylene chloride, ethyl chloride or vinyl chloride diluent utilizing the stabilizer polymers of the present invention. Heretofore, it has simply not been possible to prepare non-agglomerating butyl rubber at temperatures warmer than about $-90°$ C. Furthermore, maintenance of a stable polymerization slurry at such temperatures enables the use of a wide variety of catalysts other than $AlCl_3$ to become practicable.

The invention is further illustrated by the following examples which are not to be considered as limitative of its scope. All percentages reported are by weight unless otherwise stated.

EXAMPLE 1

The following two stabilizers were evaluated in a butyl rubber polymerization reaction. The stabilizers are designated as "S-1" and "S-2".

S-1—a butyl polymer (isobutylene-isoprene) with 29 wt% styrene grafted onto it and having a viscosity average molecular weight of 588,000.

S-2—a butyl polymer (isobutylene-isoprene) with 19% by weight of methyl methacrylate grafted onto it and having a viscosity average molecular weight of 330,000.

In conducting the batch polymerization trials, a butyl feed blend was prepared and divided into three aliquots and then all three were stored cold with agitation until the stabilizers had completely dissolved. The feed blends were prepared and handled in a nitrogen purged dry box and specially purified and dried monomers and methyl chloride were used. A stirred bath filled with 2-methyl pentane and cooled to $-99°$ C. with liquid nitrogen was built into the dry box and the flasks containing the feed blends were kept cold by immersion in the cold bath. The three feed blends prepared were:

|  | A (Run 3) |  | B (Run 1) |  | C (Run 2) |
|---|---|---|---|---|---|
| Isobutylene | 120.0 |  | 120.0 |  | 120.0 |
| Methyl Chloride | 1014.4 |  | 1014.4 |  | 1014.4 |
| Isoprene | 3.71 |  | 3.71 |  | 3.71 |
| Slurry Stabilizer | None | (S-1) | 3.60 | (S-2) | 3.60 |

A catalyst solution consisting of 0.18% $AlCl_3$ in methyl chloride was also prepared for use in initiating polymerization.

After the stabilizers had completely dissolved, a batch polymerization was run with each of the feeds. The flasks containing the feed blends and fitted with a stirrer, thermowells, and port through which catalyst solution could be dripped in, were immersed in the liquid nitrogen-cooled 2-methyl pentane bath in the dry box and stirred and cooled to $-97°$ C. Catalyst solution was then allowed to drip in slowly from a dropping funnel to initiate polymerization and cause the butyl slurry to form. The catalyst solution was dripped in slowly to keep reactor temperature from warming above $-90°$ C. When sufficient polymer had been formed, the reaction was quenched by addition of 25 ml. of cold MIBK (methyl isobutyl ketone) and the flask containing the quenched slurry and with the thermowells and stirrer in place was removed from the dry box and placed into a standard laboratory hood where it was stirred slowly and allowed to warm. 500 ml. of chilled MIBK was added to the flasks and the methyl chloride and unreacted monomers were allowed to vent out into the hood through the open port into which the catalyst had been dripped. By the time the flasks had warmed to room temperature, all the monomers and methyl chloride had flashed off and the flasks contained the butyl rubber produced during polymerization in the MIBK. The stability of the slurry was observed during polymerization and warm-up; and then the slurry in MIBK at room temperature was carefully examined at room temperature before the polymer was recovered for analysis.

Polymerization trail 1 was conducted with feed blend B containing S-1 as the slurry stabilizer—a total of 150 ml. of catalyst was used and 85% conversion of monomers to butyl polymer was achieved. A stable slurry resulted (as described more fully below) and the recovered polymer had a viscosity average molecular weight of 302,000 and an INOPO of 10. "INOPO" is a method for the determination of the degree of unsaturation in butyl rubber as reported in Industrial and Engineering Chemistry, 17, 367 (1945); it is also referred to as the Iodine-Mercuric Acetate Method.

Polymerization trial 2 was conducted with feed blend C containing S-2 as the slurry stabilizer. The polymerization was badly poisoned and a total of 600 ml. of catalyst was added to achieve only 32% conversion of monomers to polymer. Nevertheless, a stable slurry resulted (as described more fully below) and the recovered polymer had a viscosity average molecular weight of 227,000.

Polymerization trial 3 was conducted with feed blend A containing no stabilizer. A total of 125 ml. of catalyst was added to achieve 75% conversion of monomers to butyl polymer. The slurry was very unstable and completely agglomerated. The recovered polymer had a viscosity average molecular weight of 338,000 and an INOPO of 10.

The very marked improvement in slurry stability produced by the stabilizers was very apparent in this experiment. In Trials 1 and 2, containing the stabilizers, the slurry produced during polymerization appeared as a thick milk with no agglomerates apparent. Furthermore, no polymer plated out on the stirrer or any of the wetted reactor parts; a small polymer rind did form on the reactor wall at the vapor/liquid interface in the reactor, and polymer deposited on the dry reactor wall due to splashing. In Trial 3 containing no stabilizer, a much heavier rind of polymer formed at the vapor/liquid interface in the reactor and many agglomerates were visible in the thick milk which formed. Furthermore, polymer deposited on the stirrer and all reactor surfaces so that it became very difficult to even observe the slurry by the time the run was terminated.

The differences in slurry stability became even more pronounced during warming in the hood. In Trial 3 containing no stabilizer, the slurry agglomerated very rapidly as it was allowed to warm. At −85° C., there was no longer any milk left but a clear liquid containing large agglomerates and pieces of rubber. As warming continued, all the polymer agglomerated into one large mass, and stirring became impossible. In Trials 1 and 2 containing the stabilizers, a noticeable coarsening of the slurry occurred during warming so that visible particles could be distinguished, but the slurry remained as a thick milk in appearance and no agglomerates of appreciable size formed. At room temperature a stable slurry still remained. No polymer had deposited on the wetted surfaces, and most of the rind had fallen into the slurry and was dispersed as small pieces. The polymer deposited on the dry reactor walls, of course, remained. At room temperature, the slurry from Trial 1 was still a stable milk with many visible particles up to ⅛" in diameter; whereas, the slurry from Trial 2 was a stable milk with almost no visible particles. Both stabilizers were quite effective, but S-2, the butyl/methacrylate graft copolymer was the best. However, as expected, the polymethyl methacrylate did interfere strongly with the polymerization so that much more catalyst was required and the butyl molecular weight was depressed. The butyl/methyl methacrylate graft copolymer would not be suitable for use as a slurry stabilizer in the reactor, but could be injected into the reactor effluent to stabilize the slurry for heat exchange.

The greatly improved stability of the slurries produced in Trials 1 and 2 was also evident during polymer recovery. The slurry particles were much too fine to settle or screen out of the MIBK, and it was necessary to add a large amount of methanol (a non-solvent for the lyophile) before the slurry could be caused to separate from the MIBK for recovery. Even then, the rubber remained particulate and was easily redispersed by stirring.

This work shows that butyl rubber slurries in methyl chloride can be stabilized with appropriate graft copolymers containing lyophobic and lyophilic portions. The stabilized slurries survive warming to room temperature without massive agglomeration and thus could be heat exchanged to recover sensible refrigeration energy. A graft copolymer containing 29 wt% styrene grafted onto isobutylene-isoprene butyl and a graft copolymer containing 19% methyl methacrylate grafted onto isobutylene-isoprene butyl are both effective slurry stabilizers. The styrene graft copolymer does not inactivate the butyl polymerization catalyst or interfere with polymerization and hence can be added to the butyl feed to stabilize the slurry as it forms and prevent agglomeration and fouling in the reactor.

EXAMPLE 2

A batch dry box polymerization was run to evaluate a diene/styrene block copolymer as a butyl slurry stabilizer in the reactor during polymerization. The stabilizer was a diene/styrene block copolymer prepared via anionic polymerization and designated as S-3. The diene block was an isoprene/butadiene copolymer which was attached to a pure styrene block. The overall polymer composition was 27 mole % styrene, 34.4 mole % isoprene and 38.6 mole % butadiene with an $\overline{M}n$ of 63,000. For convenience in adding it to the reactor, the block copolymer was dissolved in methylene chloride to give a 0.5% solution.

In order to conduct the batch polymerization trials, a butyl feed blend was prepared in the dry box as for Example 1. The feed blend consisted of:

| | |
|---|---|
| Isobutylene | 230.40 g. |
| Methyl Chloride | 1947.50 g. |
| Isoprene | 7.13 g. |

Polymerization were conducted in stirred 500 ml. 4-neck round bottom flasks immersed in the liquid nitrogen cooled 2-methyl pentane bath in the dry box and each flask contained a thermowell to permit monitoring polymerization temperature and a port into which catalyst could be dripped to initiate polymerization. 230 g. aliquots of the feed blend (consisting of 24.25 g. isobutylene, 0.75 g. isoprene and 205 g. methyl chloride) were weighed into the 500 ml. reaction flask for each batch run and the flask was stirred and cooled in the 2-methyl pentane bath to 83° C. before polymerization was initiated. A warmer than normal polymerization temperature was used so that an unstabilized slurry would agglomerate in the reactor during polymerization and the effectiveness of the stabilizer could thus immediately be determined. Catalyst was allowed to drip in slowly to keep reactor temperature below −80° C. and the polymerizations were quenched with methanol at the end of the run.

EXAMPLE 2(a)

Polymerization was initiated by adding diethyl aluminum chloride in hexane as catalyst to the chilled stirring feed and then dripping in a dilute solution of chlorine in methyl chloride as co-initiator to produce the desired amount of polymer. The diethyl aluminum chloride (DEAC) was added as a 22.5% solution in hexane and the chlorine was dripped in as a 0.036% solution in methyl chloride.

In this control run containing no slurry stabilizer, 5 ml. of 22.5% DEAC were added to 230 g. of feed in the 500 ml flask and then 3.5 ml. of the 0.036% $Cl_2$ solution was dripped in slowly to initiate polymerization. A slurry formed and then agglomerated into a ball directly in the reactor. A 21% conversion of monomers to butyl was achieved to produce a butyl polymer with $\overline{M}v = 285,000$ and INOPO=8.2.

EXAMPLE 2(b)

In this run, 10 g. of the 0.5% solution of S-3 in methylene chloride was added to 230 g. of feed in the 500 ml. flask to give a feed blend containing 0.2% stabilizer on monomers. Then 5 ml of 22.5% DEAC was added followed by dripping in 3 ml. of the 0.036% $Cl_2$ solution to produce the polymer. In this run, a stable, milky appearing slurry was formed which showed no tendency to agglomerate during polymerization or after quenching. A 20% conversion of monomers to butyl polymer was achieved. The polymer was recovered by allowing the methyl chloride to flash off in the hood and then washing the deposited polymer in methanol. The diene/styrene block copolymer was an effective slurry stabilizer at $-80°$ C. Unfortunately, the polymer recovered from this run contained 60% gel. Apparently, the diene copolymer chain segment participates in the polymerization to cause gel formation. Hence, while the diene/styrene block copolymer was an effective slurry stabilizer, it would not normally be desirable to have it present in the reactor during polymerization. It is apparently the isoprene moieties in the diene chain which participate in the polymerization and cause gel formation.

The results of experiments of Example 2(a) and 2(b) do show though, that a diene/styrene block polymer containing 27 mole % styrene can function as a slurry stabilizer for a butyl slurry in methyl chloride, but only if added after completion of polymerization.

EXAMPLE 3

A series of batch dry box runs, very similar to those described in Example 2, was run to evaluate two other diene/styrene block copolymers as butyl slurry stabilizers. The block copolymers evaluated were designated as Stabilizers "S-4" and "S-5":

S-4—A diene/styrene block copolymer with an isoprene/butadiene diene copolymer block and a pure styrene block with an $\overline{M}n$ of 82,000. The overall polymer composition was 36 mole % styrene, 46 mole % isoprene and 18 mole % butadiene.

S-5—A diene/styrene block copolymer with an isoprene/butadiene copolymer block and a pure styrene block with an $\overline{M}n$ of 65,000. The overall polymer composition was 51 mole % styrene, 39 mole % isoprene, and 10 mole % butadiene.

The diene/styrene block copolymers were dissolved in methyl chloride as 1% solutions for addition to the reactions. A feed blend was prepared as in the previous examples and aliquots were placed into the 500 ml. reactors for polymerization runs. Each run was conducted with 230 g. of feed containing 24.25 grams isobutylene, 0.75 g. isoprene and 205 g. methyl chloride. The slurry stabilizer was added at 2% on monomers. Polymerizations were started at $-83°$ C. and kept colder than $-80°$ C. as in Example 2. Polymerization was initiated by adding 1 ml. of 10% triethyl aluminum (TEAL) in hexane and then dripping in 1% $TiCl_4$ in methyl chloride to form the catalyst system and produce the desired amount of polymer.

In a control run with no stabilizer, 1 ml. of 10% TEAL in hexane was added and 15 ml. of 1% $TiCl_4$ was dripped in to give 61% conversion of monomers to polymer with an $\overline{M}v$ of 317,000 and an INOPO of 10.3. A muddy brown slurry formed and immediately agglomerated to give a clear brown liquid containing a large mass of agglomerated polymer.

In the run with S-4 as the slurry stabilizer, 1 ml. of 10% TEAL in hexane and 15 ml. of 1% $TiCl_4$ was added to give 64% conversion of monomers to polymer while in another run with S-5 as the slurry stabilizer, 15 ml. of 1% $TiCl_4$ was added with 1 ml. of 10% TEAL in hexane to give 62% conversion of monomers to polymer. Both these polymers had a high gel content and so could not be characterized. In both these runs, a muddy brown milk formed and then slowly partially agglomerated. The slurries produced were much more stable than the control, but did not persist as a fine stable milk.

These runs again show that diene/styrene block copolymers can function as slurry stabilizers for a butyl slurry in methyl chloride, but that diene chains containing isoprene moieties cannot be present in the reactor during polymerization without resulting in gel formation. But these stabilizers are suitable for use when added to reactor effluent.

EXAMPLE 4

A set of batch dry box runs very similar to those described in Examples 2 and 3 were run to evaluate a preformed diene/styrene block copolymer stabilizer in which the diene block consisted entirely of butadiene. The block copolymer were prepared by anionic polymerization using n-butyl lithium catalysis and was designated as S-6. The block copolymer had the following analyses: 44.3 mole % butadiene, 55.7 mole % styrene [$\overline{M}n = 6400$; $\overline{M}w = 9200$ by GPC (gel permeation chromotography)].

In conducting the dry box evaluations, a feed blend was prepared as in the previous examples and aliquots were placed into the 500 ml. reactors for polymerization runs. Each run was conducted with 460 g. of feed containing 48.5 grams isobutylene, 1.5 grams isoprene and 410 grams methyl chloride. The larger feed charge was used so that the 500 ml. flask was nearly full and the dry wall area on which rubber could plate out was minimized. In the control Run A, no slurry stabilizer was used whereas in Run B 2.0 grams of block copolymer S-6 was added to the feed and stirred cold for about 25 minutes to completely dissolve the block copolymer in the feed. Polymerization was initiated by dripping a 0.18% solution of $AlCl_3$ in methyl chloride into the stirred feed maintained at a temperature of $-97°$ to $-93°$ C. After sufficient polymer had been formed, the polymerization was quenched with cold MIBK and then transferred to a hood where it was allowed to warm slowly with stirring and cold MIBK was added as the methyl chloride flashed off. A total of 200 ml. of MIBK was added and slurry stability was evaluated as in the prior examples.

The slurry produced in Run B with 4% slurry stabilizer on monomers was markedly more stable than that produced in control Run A with no stabilizer. In the control run much rubber deposited on the reactor walls and stirrer during polymerization and many agglomerates were present as the reactor was transferred cold to the hood. It agglomerated very rapidly as it warmed in the hood and was already a clear liquid with a large agglomerated mass of rubber by the time it reached $-85°$ C. further stirring was impossible. In Run B with 4% S-6 on monomers as stabilizer, a stable thick milk formed with no plating out on wetted reactor surfaces. It remained stable during warming and at room temperature was a fine dispersion of butyl rubber in MIBK. Average particle size was ~2 mm. The slurry settled slowly when stirring was stopped but easily redispersed when stirring was started again. Clearly the butadiene/styrene block copolymer is an effective slurry stabilizer and produced a stable slurry that could survive warming to room temperature without massive agglomeration.

The polymer from Run B was recovered by allowing the slurry to settle and decanting off the MIBK and then reslurrying twice in acetone and decanting to remove as much of the soluble block copolymer stabilizer as possible. A stable dispersion resulted during the acetone washes. Methanol was then added to the remaining rubber and it immediately agglomerated into a mass which was washed and then vacuum oven dried to recover 15.79 grams of an opaque, white tough rubbery butyl polymer with an $\overline{M}v$ of 1,154,000 and an INOPO of 9.7. It was completely soluble and contained no gel. Polymer recovered from the control Run A was similar in appearance with an $\overline{M}v$ of 1,130,000 and an INOPO of 8.3

The MIBK and acetone decants from Run B were combined and evaporated to concentrate the extracted block copolymer which was recovered by adding methanol to precipitate it as a soft mass which was filtered out and then vacuum dried to recover 1.56 g. of styrene/butadiene block copolymer with similar inspections to the added copolymer. Only 79% of the copolymer stabilizer was extracted by this procedure with the rest being contained in the butyl as shown by the higher INOPO of the stabilized polymer.

These runs show that a butadiene styrene block copolymer is an effective stabilizer for a butyl slurry in methyl chloride and it can be present during polymerization without causing gel or adversely affecting the butyl polymer produced.

EXAMPLE 4A

A batch dry box run very similar to that of Examples 2 to 4 were run to evaluate a functional group containing polystyrene as a stabilizer for a butyl slurry in methyl chloride. The functional polystyrene was a low molecular weight anionic polystyrene capped with vinyl benzyl chloride and had the following structure:

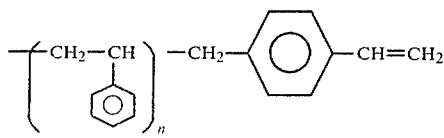

The end functional group is cationically copolymerizable with isobutylene-isoprene and can become incorporated into a growing butyl chain during polymerization to yield a butyl molecule containing one or more pendant lyophilic polystyrene chains thereby to act as a slurry stabilizer. The vinyl benzyl chloride-capped polystyrene evaluated as a functional lyophilic stabilizer precursor and designated as S-7 in this run had the following analysis:

$\overline{M}v = 14,800$; $\overline{M}n = 10,960$; $Mw/Mn = 1.41$; Taylor $I_2$ No. $= 2.15$ The batch polymerization to evaluate the stabilizer was run in a 500 ml. round bottom flask as in the previous example, but at typical butyl polymerization temperature and using $AlCl_3$ as the catalyst. Also, a feed charge of 460 g. was used so that the 500 ml. flask was nearly full and the dry wall area on which rubber could plate out was minimized. The feed charged to the flask was 48.5 g. isobutylene, 1.5 g. isoprene and 410 g. methyl chloride. Two grams of the S-7 stabilizer precursor was added to the feed. The polystyrene was added as a dry powder and stirred in cold. It was of such low molecular weight that is dissolved within a few seconds. No stabilizer precursor was added in a control run. A 0.13% solution of $AlCl_3$ in methyl chloride was added dropwise to the stirred chilled feed to produce polymer as usual. Polymerization was begun when the stirred feed reached $-97°$ C. and catalyst rate was controlled to maintain reactor temperature below $-90°$ C. The polymerization was quenched with cold MIBK and then transferred to the hood where it was allowed to warm slowly with stirring as in Example 1, and cold MIBK was added as the methyl chloride flashed off. A total of 200 ml. of MIBK was added. Slurry stability was evaluated as in prior examples.

The slurry produced in the run of this example with 4% stabilizer precursor on monomer was markedly more stable than that produced in the control run with no stabilizer precursor. A lot of polymer deposited on the reactor walls and stirrer during the control run and the slurry contained many visible agglomerates when examined cold in the dry box. It agglomerated quite rapidly during warming in the hood and was already a clear liquid with large agglomerates by the time it had warmed to $-80°$ C. At room temperature the rubber was one solid mass in clear MIBK. In the run of this example with 4% S-7 on monomers as stabilizer the slurry formed as a nice stable thick milk with no visible particles and no plating out on wetted reactor surfaces. It remained stable during warming and at room temperature was still a very fine stable dispersion of butyl rubber particles in the MIBK. Considerable particle growth had occurred during warming and the slurry would settle slowly when stirring was stopped, but easily redispersed when stirring was started again. The slurry particles were fine specks of rubber much less than 1 mm in size. Clearly the functional polystyrene is an effective slurry stabilizer precursor and results in the in situ formation of a copolymer stabilizer that produces a stable slurry which survived warming to room temperature without massive agglomeration.

In order to determine how much of the functional polystyrene had reacted during polymerization and become incorporated into the butyl, the unreacted polystyrene was extracted and recovered during polymer workup. The slurry was allowed to settle and the clear MIBK layer containing the dissolved unreacted polystyrene was decanted off. The slurry was then reslurried in 300 ml. of acetone which is a good solvent for the polystyrene and again allowed to settle and the clear acetone layer containing additional dissolved polystyrene was decanted and combined with the decanted MIBK. This was repeated twice to extract all the polystyrene not attached to the butyl. The slurry showed no tendency to agglomerate during this treatment. It redispersed rapidly when stirred in the acetone to fine particles less than 1 mm in size and settled slowly. The incorporated stabilizer had formed an effective barrier against agglomeration and was maintaining the slurry stable as discrete particles. After the final decanting, methanol, a non-solvent for polystyrene, was added to the rubber slurry to agglomerate the particles sufficiently to allow recovery. The combined MIBK and acetone extracts were evaporated to concentrate the dissolved functional polystyrene which was then recovered by adding methanol to precipitate it and then filtering. 1.60 g. of functional polystyrene were recovered indicating that 0.4 g. had reacted and combined with the butyl. The recovered polystyrene had an $\overline{M}v$ of 15,900 and a TAYLOR $I_2$ No. of 1.35 showing it was similar to the charged material but slightly less functional. 36.73 g. of butyl rubber were recovered with an $\overline{M}v$ of 589,000 and INOPO of 9.1. Thus 73,5% conversion of monomers to butyl had been achieved and 20% of the functional polystyrene had become incorporated in the rubber in non-extractable form. Material balance thus indicates the butyl contained 1.1% polystyrene by weight. This was confirmed by U.V. and NRM analyses. This work shows that a functional polystyrene can be chemically bonded with a portion of butyl during polymerization to effectively stabilize the resulting slurry.

EXAMPLE 5

Batch dry box runs exactly like those described in Example 4A were run to evaluate other low molecular weight polystyrenes as slurry stabilizer precursors. An anionically polymerized polystyrene capped with methallyl chloride designated as S-8 was used as a stabilizer precursor in this example. This functional polystyrene had the following structure:

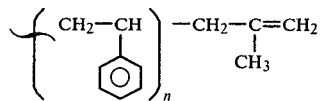

and contained an end functional group capable of becoming incorporated into a growing butyl chain. This functional polystyrene had the following analyses:

$\overline{M}v=13,300$; $\overline{M}n=9,260$; $Mw/Mn=1.41$; INOPO=2.96.

A comparative experiment was carried out using an anionically polymerized polystyrene quenched with methanol, and therefore, nonfunctional. This polystyrene had the following structure:

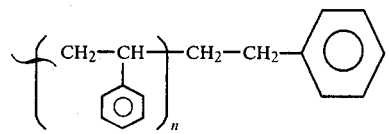

and did not contain a functional group active in cationic polymerization. It had the following analyses:

$\overline{M}v=11,200$; $\overline{M}n=9,170$; $Mw/Mn=1.22$; TAYLOR $I_2$ ⅛ =0.

The batch polymerizations were run exactly as described in Example 4A and the same workup procedures were used. The polystyrenes were added to the feed aliquots in the 500 ml. reactors as dry powders and dissolved within a few seconds. The polystyrene level was 4% on monomers.

As described previously, unstable slurries which agglomerated rapidly and completely during warmup resulted from the control runs with no stabilizer. A stable slurry which survived warming to room temperature resulted from the run of this example with the methallyl chloride capped polystyrene, S-8, as stabilizer precursor. Some growth occurred during warming, but the final slurry particles were all <0.1" in diameter. Of the 2.0 g. of polystyrene charged, 1.66 g. were recovered by the extraction procedure indicating 0.34 g. had become incorporated in non-extractable form into the butyl. 43.71 g. of butyl were produced indicating an 87.4% conversion of monomers to butyl and a 17% incorporation of the functional polystyrene. The slurry was stabilized by incorporation of about 0.4% incorporated functional polystyrene. The recovered polystyrene was essentially identical to the charged material:

$\overline{M}v=14,300$; INOPO=2.88. The butyl had an $\overline{M}v=628,500$ and INOPO=9.4.

The slurry which resulted from the comparative run with the non-functional polystyrene as stabilizer was quite unstable but better than the control. It agglomerated quickly during warmup and at room temperature the rubber was in larger chunks ranging from ¼" to 1". Of the 2.0 g. of polystyrene charged, 1.99 g. were recovered unchanged by the extraction procedure indicating that none hand become incorporated. 37.30 g. of butyl were recovered showing that 74.6% conversion of monomers to butyl had been acheved.

These experiments show that a non-functional polystyrene does not incorporate into the butyl during polymerization and is not an effective stabilizer precursor. The work further shows that a methallyl chloride capped polystyrene is an effective stabilizer precursor with only 0.4% incorporation into the rubber imparting very good stability. However, the methallyl chloride capped polystyrene is not as readily incorporated into the polymerizing butyl as was the vinyl-benzyl chloride capped polystyrene, under the conditions used in Example 4A.

EXAMPLE 6

Another series of batch dry box polymerization was run exactly like those described in Examples 4A and 5 except at a very warm polymerization temperature to prove that stabilized slurries would permit polymerization at higher temperatures. In this series of dry box runs polymerization was initiated at a reactor temperature of −47° C. and the catalyst rate was controlled to keep reactor temperature below −40° C. The functional polystyrenes used as stabilizer precursors were: S-9 in run 6(a) was a vinyl benzyl chloride capped anionic polystyrene with the following analyses:

$\overline{M}v = 26,930$; $\overline{M}n = 21,790$; $Mw/Mn = 1.39$;
TAYLOR $I_2 = 1.10$.

S-10 in run 6(b) was a vinyl benzyl chloride capped anionic polystyrene with the following analyses:

$\overline{M}v = 50,500$; $\overline{M}n = 34,940$; $Mw/Mn = 1.56$;
TAYLOR $I_2$ No. $= 0.66$.

The stabilizer precursors were added to the feed aliquots as dry powders and dissolved almost instantly as described earlier. The stabilizer precursors were added at only 1% on monomers in these runs. The feed blend was as described above in Example 2 and 0.15% $AlCl_3$ in methyl chloride was used as the catalyst. In a control run with no stabilizer, 10.5 ml. of catalyst were added to give essentially complete conversion of monomers to polymer with an $\overline{M}v$ of 150,000 and INOPO of 5.1. The slurry was very unstable and all of the butyl agglomerated into a large mass at once. In run 6(a) with S-9 as the stabilizer precursor, 17 ml. of catalyst was used to give 83.5% conversion of monomers to polymer with an $\overline{M}v$ of 67,000 and INOPO of 6.3. The slurry was a very stable thick milk and survived warming to room temperature and replacement of the methyl chloride with MIBK without agglomeration. Slurry particle size was much less than 0.1 mm. In run 6(b) with S-10 as the stabilizer precursor, 16 ml. of catalyst gave 82.5% conversion of monomers to polymer with an $\overline{M}v$ of 67,000 and INOPO of 6.2. Again the slurry was a very stable thick milk which survived warming to room temperature with no agglomeration. Material balance calculations and polymer analyses showed that 0.58% by weight of polystyrene had become incorporated in non-extractable form in run 6(a) and 0.64% of polystyrene in run 6(b). Thus, good incorporation of the functional polystyrene was achieved and excellent slurry stability was produced. Photographs taken of the slurries at room temperature in MIBK showed the excellent stable slurries which were achieved in these runs. The control was a solid mass of butyl in clear MIBK; both stabilized slurries appear as stable fine dispersions of the butyl particles in MIBK.

These experiments show that functional polystyrenes are very effective stabilizer precursors for butyl slurries and that at low (and thus economical) incorporation levels (∼0.5% on rubber) very stable slurries can be achieved. The use of these stabilizer precursors and subsequent in situ formation of stabilizer would permit polymerization at much warmer temperatures than can now be used and would permit recovery of refrigeration energy from the cold reaction product by employing heat exchange with warm reactor feed.

EXAMPLE 7

This example illustrates the use of a block copolymer formed in situ by a chain transfer or co-catalytic initiation mechanism. A chlorine-capped polystyrene was prepared by radical polymerization of styrene in carbon tetrachloride at 70° C. using AZBN (azobisisobutyronitrile) as the initiator. The initial sytrene concentration was 43.5% by weight and the polymerization was carried out to 28.5% by weight conversion of styrene. A chlorine-capped polystyrene with a viscosity average molecular weight of 16,700 was recovered and had the following structure:

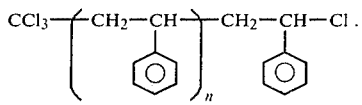

It was evaluated as a slurry stabilizer precursor according to the method of Example 4 and yielded an excellent stable isobutylene-isoprene butyl rubber slurry which survived warming to room temperature in MIBK as a very fine stable slurry. A comparative control polymerization reaction containing no stabilizer agglomerated completely.

EXAMPLE 8

This example is another illustration of the use of a block copolymer formed in situ by a chain transfer or co-catalytic initiation mechanism.

A styrene-vinyl benzyl chloride copolymer was prepared by radical polymerization in toluene at 80° C. using AZBN as the initiator. The feed charge was 44.3% by weight monomers in toluene with 2% by weight of vinyl benzyl chloride on styrene, and the polymerization was carried to 40.5% by weight conversion. The styrene/vinyl benzyl chloride copolymer with a viscosity average molecular weight of 35,200 was recovered.

It was evaluated as a slurry stabilizer precursor according to the method of Example 4A and yielded an excellent stable isobutylene-isoprene butyl rubber slurry which survived warming to room temperature in MIBK as a very fine stable slurry. A control polymerization reaction containing no stabilizer agglomerated completely.

EXAMPLE 9

This example is an illustration of a block copolymer formed in-situ by a chain transfer or cocatalytic initiation mechanism as a slurry stabilizer for a polyiso butylene slurry in methyl chloride. For this series of dry box runs, a feed blend consisting of 10.9% isobutylene in methyl chloride was prepared and aliquots were charged into the 500 ml. reactors for individual polymerization runs. Each run was conducted with 460 grams of feed consisting of 50 grams of isobutylene and 410 grams of methyl chloride. Polymerizations were initiated at a temperature of −45° C. by dripping in a 0.14% $AlCl_3$ in methyl chloride catalyst solution into the stirred feed maintained at a temperature of −45°→−40° C. After sufficient polymer had been formed, the polymerization was quenched with cold MIBK and transferred to a hood where it was allowed to warm slowly with stirring and cold MIBK was added as the methyl chloride flashed off as in the prior examples.

Run 9B was control run containing no stabilizer. 0.5 grams of stabilizer precursor were added to the feed for Runs 9A and 9C and stirred in to dissolve the stabilizer precursor before polymerization, the stabilizer level was 1% on the isobutylene.

The stabilizer precursor used in Run 9A was a chlorine-capped polystyrene prepared by radical polymerization of styrene in carbon tetrachloride at 70° C. using AZBN as the initiator. The initial styrene concentration was 65.2% and polymerization was carried to 40.1% conversion of the styrene. The chlorine-capped polystyrene had a viscosity average molecular weight of 29,340, contained 2.27% chlorine and had the following structure:

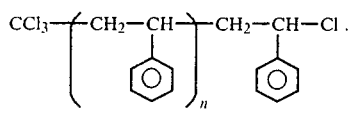

The stabilizer precursor used in Run 9C was a styrene/-vinyl benzyl chloride copolymer prepared by radical polymerization in toluene at 80° C. using AZBN as the initiator. The feed charge was 54.4% monomers in toluene with 0.81% by weight vinyl benzyl chloride on styrene and polymerization was carried to 46.1% conversion. The styrene/vinyl benzyl chloride copolymer had a viscosity average weight of 40,150 and contained 0.21% chlorine due to the incorporated vinyl benzyl chloride. Its structure was as shown hereinabove (on Pg. 13 Line 6-8.)

In the control run with no stabilizer (9B), the polyisobutylene completely agglomerated during polymerization and was removed from the dry box as a large mass of polymer in clear liquid—stirring was impossible. 49.25 grams of polyisobutylene were recovered with a viscosity average molecular weight of 92,000.

The runs containing in-situ formed stabilizers, 9A and 9C, both yielded fine stable milky dispersions which survived warming to warm temperature as fine stable dispersions with most particles too small to be visible to the naked eye. Microscopic examination of the dispersions in MIBK at room temperature showed the particles in both were mostly below $1\mu$ in diameter. In Run 9A, 28.70 grams of polyisobutylene of $\overline{M}v$—79,200 were recovered while in Run 9C, 30.17 grams of polyisobutylene of $\overline{M}v$—58,900 were recovered. The polyisobutylene produced in Run 9A contained 0.63% unextractable polystyrene while that in Run 9C contained 0.64% unextractable polystyrene.

This run shows that slurry stabilizers are effective at stabilizing polyisobutylene slurries in methyl chloride just as with butyl rubber slurries. As little as 0.63% bound polystyrene on the polyisobutylene is capable of preventing agglomeration of the polyisobutylene slurry and allowing it to survive as a stable slurry up to room temperature so that the refrigeration energy could be recovered from the reactor effluent by heat exchange with warm reactor feed.

EXAMPLE 10

This example is an illustration that the same stabilizers which effectively stabilize a butyl slurry in methyl chloride are also effective stabilizers for a butyl slurry in methylene chloride. For this series of dry box runs a feed blend of isobutylene and isoprene in methylene chloride was prepared and divided into aliquots for the individual polymerization runs. A 600 gram aliquot of this feed blend was charged to the 500 ml. reactors as in the previous examples for polymerization runs. The feed for each run then was 97.0 grams isobutylene, 3.0 grams isoprene, 500.0 grams methylene chloride. Polymerization was initiated by dripping in a 0.20% catalyst solution of $AlCl_3$ in methylene chloride into the stirred feed at a temperature of $-97°$ C. and maintainig reactor temperature between $-97°$ and $-92°$ C. After sufficient polymer had formed the polymerization was quenched with 10 ml. of cold MIBK and then transferred to a hood and allowed to warm with slow stirring. Since methylene chloride boils at 39.8° C. it did not boil off as the slurry warmed and so it was not necessary to add more MIBK. The final slurry at room temperature was still in the methylene chloride polymerization diluent.

Run 10A was a control run containing no stabilizer. Run 10B contained 1.0 grams of a chlorine-capped polystyrene (1% on monomers) dissolved in the feed prior to initiating polymerization and Run 10C contained 4.0 grams of a vinyl benzyl chloride-capped polystyrene (4% on monomers) dissolved into the feed prior to initiating polymerization. The chlorine-capped polystyrene used as a stabilizer precursor in Run 10B was prepared by radical polymerization of styrene in carbon tetrachloride at 70° C. using AZBN as the initiator. The initial styrene concentration was 80% and polymerization was carried to 49.9% conversion. This chlorine-capped polystyrene had a viscosity average molecular weight of 54,010 and contained 2.47% chlorine.

The VBC-capped polystyrene used as a stabilizer precursor in Run 10C was prepared by anionic polymerization using n-butyl lithium catalysis. It had an $\overline{M}n$ of 34,100 and $\overline{M}w$ 46,300.

In the control polymerization (Run 10A with no added stabilizer) a coarse slurry formed in the reactor with the butyl slurry particles showing a strong tendency to rise to the surface and agglomerate and plate out on the reactor walls and stirrer. When the reactor was transferred to the hood, the butyl rubber all rose to the surface and agglomerated into a mass of polymer so that stirring was impossible. However as the reactor warmed, the butyl rubber mass appeared to imbibe the diluent phase (methylene chloride and unreacted monomers) and softened and expanded to nearly fill the entire reactor volume. The diluent containing polymer mass became soft enough that stirring could be resumed, but the reactor contents were an extremely viscous gel-like mass of highly diluent swollen polymer. When stirring was stopped at room temperature, the reactor was almost entirely filled with a viscous gel-like mass of diluent swollen polymer with only a small amount of a clear thin liquid phase (methylene chloride) on the top. When acetone was stirred in, the rubber mass immediately exuded the diluent phase to form a normal precipitated mass of butyl rubber which was removed and washed in alcohol prior to vacuum oven drying. 35.92 grams of butyl rubber of $\overline{M}v$ 273,000 were recovered (the relatively low molecular weight was probably due to poisons present in the methylene chloride used). The unstable slurry in methylene chloride was quite different from that in methyl chloride because the methylene chloride is much more soluble in the rubber but the unstabilized slurry in methylene chloride is also badly fouling and could not be cooled effectively in the reactor or heat exchanged with incoming feed to recover refrigerant energy.

In Run 10B with 1% of the chlorine-capped polystyrene dissolved in the feed as stabilizer precursor, a stable slightly yellowish milky slurry formed in the reactor with the yellowish tint disappearing when the MIBK quench was added. The milk was nice and fluid with little tendency to rise or plate out. It was transferred to the hood as a fine stable milky dispersion. As it was allowed to warm with stirring, it remained as a stable thin fluid which was easily stirred but changed in appearance becoming more of a translucent emulsion in appearance than an opaque milky dispersion. At room temperature it remained as a nice fluid stable emulsion which could be pumped or heat exchanged easily. It did not separate when stirring was stopped. When acetone was stirred in, the emulsion changed in appearance and became a fine particulate dispersion of butyl rubber particles of size ranging from invisible to ~1 mm. The dispersion was fluid and stable while stirring. When stirring was stopped the butyl particles slowly rose to leave a slightly cloudy liquid layer at the bottom, but easily redispersed when stirring was resumed. The rubber was recovered by drawing off the bottom methylene chloride/acetone layer and reslurrying the rubber particles twice in acetone to extract any uncombined polystyrene. The rubber particles reslurried easily in the acetone to form a stable dispersion which settled slowly when stirring was stopped. The extracted slurry particles were caused to agglomerate into a mass by adding methanol and then washed and vacuum oven dried to recover 39.65 grams of butyl rubber of $\overline{M}v$ 217,800. The butyl rubber contained 0.46% unextractable polystyrene. This experiment shows that small and economic amounts of a stabilizer are able to stabilize a butyl rubber slurry in methylene chloride to realize all of the benefits previously recited for stabilized butyl rubber slurries in methyl chloride.

In Run 10C with 4% of the vinyl benzyl chloride-capped polystyrene dissolved in the feed as stabilizer precursor the behavior was very much as in Run 10B. A stable slurry was formed and a fluid easily stirred system persisted during warming as contrasted to the unstable fouling viscous gel-like system which formed in the control polymerization containing no stabilizers. However, the final dispersion of butyl rubber in the methylene chloride/acetone mixture of Run 10C was somewhat coarser than that of Run 10B despite the larger amount of stabilizer precursor used. The chlorine-capped polystyrene is effective at lower concentrations than is the vinyl benzyl chloride capped polystyrene. 31.66 grams of butyl rubber of $\overline{M}v=288,200$ were recovered from this run. The rubber continued 0.71% unextractable polystyrene acting as the slurry stabilizer. This experiment shows that the stabilizers which are effective for producing stable butyl rubber or polyisobutylene slurries in methyl chloride are also effective for producing stable butyl rubber or polyisobutylene slurries in methylene chloride.

EXAMPLE 11

The previous examples of the effectiveness of slurry stabilizers have all been batch polymerizations in a dry box, whereas commercially produced butyl rubber and polyisobutylene are normally produced in continuous reactors in which the slurry is pumped around through heat exchange tubes to remove the heat of polymerization. As a further demonstration of the practical significance of this invention we have conducted experiments in a small pilot unit continuous reactor to illustrate the effectiveness of slurry stabilizers under continuous production conditions. These experiments were conducted in a one gallon continuous stirred draft tube reactor which is a small prototype of typical commercial butyl reactors. The reactor was a modified, draft-tube containing well-stirred tank type reactor of nominal one gallon capacity and containing 2.86 square feet of heat transfer surface to remove the heat of polymerization and maintain the reactor at polymerization temperature. Up to four feed and catalyst streams could be chilled and metered continuously into the reactor and the reactor effluent was continuously overflowed through a ¾ inch line into chilled product slurry receivers for quenching and recovery. Reactor temperature was maintained and controlled by circulating a heat transfer fluid at a controlled temperature and rate through the reactor heat transfer surfaces.

Previously it has been found that small pilot unit butyl reactors are not able to operate at as high slurry concentrations as the larger commercial reactors because of the much smaller size of the inlet and exit ports and heat transfer passages in the small pilot reactors. Typically one gallon pilot reactors are limited to operation with a 12 to 14% slurry whereas 1700 gallon commercial reactors have operated with 25 to 30% slurries. Nevertheless, improvements in the operation of the small pilot reactors are generally translatable to improvements in operation of the larger commercial reactors.

In a series of conventional runs without added stabilizers it was found that the one gallon pilot unit butyl reactor used in these experiments could operate successfully at a 12 to 14% slurry concentration, but fouled out quite rapidly when attempts were made to operate at significantly higher slurry concentrations. Steady-state operating conditions for a typical run, Example 11A, at an operable slurry concentration are shown below:

The following three feeds were prepared, chilled and metered into the stirred and cooled reactor.

Feed 1 was 34% monomers, consisting of 3% isoprene and 97% isobutylene in methyl chloride and was fed into the bottom draft tube of the reactor at a rate of 81.2 grams per minute.

Feed 2 was a pure methyl chloride stream and was metered and chilled and then blended with Feed 1 and fed into the reactor at a rate of 80.8 grams per minute.

Feed 3 was the catalyst stream consisting of 0.20% AlCl$_3$ in methyl chloride and was fed into the top annulus of the reactor at a rate of 10.0 grams per minute.

Total feeds in gram per minute to the reactor then were:

| | |
|---|---|
| Isoprene | 0.83 |
| Isobutylene | 26.77 |
| Methyl Chloride | 144.37 |
| AlCl$_3$ | 0.02 |
| Total | 171.99 |

At steady-state the reactor effluent was a 14% slurry of butyl rubber in methyl chloride plus unreacted monomers. The reactor effluent consisted of:

| |
|---|
| 24.1 grams Butyl Rubber |
| 3.5 grams Monomers |
| 144.37 grams Methyl Chloride |
| 0.02 grams AlCl$_3$ |
| 171.99 grams Total |

Reactor temperature was controlled at −96° C. and the effluent was a thick yellowish slurry which turned white upon quenching. Conversion of monomers to polymer was 87% and the reactor was operating at about the maximum sustainable slurry concentration. Slow fouling was evidenced by the need for a slowly increasing temperature difference between the coolant and reactor contents in order to maintain temperature.

Efforts to establish a steady-state at a higher slurry concentration resulted in very rapid fouling out of the reactor.

In contrast to this introduction of a slurry stabilizer has enabled stable steady-state operation with minimal fouling rates to be achieved at much higher slurry concentrations.

In Example 11 B, the vinyl benzyl chloride capped polystyrene of Example 10 C was used as the stabilizer precursor. This anionically polymerized polystyrene had an $\overline{M}n$ of 34,100 and an $\overline{M}w$ of 46,300. It was dissolved in methyl chloride to yield a 4.76% solution of the functional polystyrene in methyl chloride as a feed to the reactor. The feeds to the reactor for this example were:

Feed 1 was 51.1% monomers, consisting of 2.38% isoprene and 97.62% isobutylene, in methyl chloride and was fed into the bottom draft tube of the reactor at a rate of 78.0 grams per minute.

Feed 2 was 4.76% VBC-capped polystyrene in methyl chloride and was metered and then blended with feed 1 and fed into the reactor at a rate of 16.9 grams per minute.

Feed 3 was the catalyst stream consisting of 0.20% $AlCl_3$ in methyl chloride and was fed into the top annulus of the reactor at a rate of 15.0 grams per minute.

Feed 4 was pure methyl chloride and was metered chilled and then blended with feeds 1 and 2 and fed into the reactor at a rate of 26.9 grams per minute.

Total feeds, in grams per minute, to the reactor then were:

| Isoprene | 0.95 |
|---|---|
| Isobutylene | 38.91 |
| Methyl Chloride | 96.11 |
| VBC-Capped Polystyrene | 0.80 |
| $AlCl_3$ | 0.03 |
| Total | 136.80 |

The stabilizer precursor level was 2.0% on monomers. At steady-state the reactor effluent was a 22% slurry of butyl rubber in methyl chloride plus unreacted monomers. The reactor effluent consisted of:

| 30.10 grams butyl rubber |
|---|
| 9.76 grams monomers |
| 96.11 grams methyl chloride |
| 0.80 grams polystyrene (partly bound to butyl) |
| 0.03 grams $AlCl_3$ |
| 136.8 |

Reactor temperature was controlled at $-96°$ C. and the effluent was a thin yellow very fine dispersion of butyl rubber particles which turned white upon quenching. Conversion of monomers to butyl was 75.5% and the reactor was operating smoothly producing a very fluid stable slurry with no evidences of any reactor fouling. This is a much higher slurry concentration than could be achieved without the stabilizer present. As a further demonstration of the beneficial effect of the stabilizer, Feed 2 to the reactor was simply replaced with a pure methyl chloride stream so feed to the reactor remained unchanged except that no functional polystyrene stabilizer precursor was being fed. Within a few minutes the effluent began to become coarser and to thicken and very rapid reactor fouling began to occur. Polymer began to severely plate out inside the overflow tube and on the heat transfer surfaces (as evidenced by an increase in the temperature difference between coolant and reactor). Within 15 minutes it was no longer possible to maintain reactor temperature because of the fouling inside the reactor and the reactor began to warm. Within 20 minutes the reactor had completely plugged with agglomerated rubber—the stirrer jammed and the overflow was solidly plugged. The run had to be stopped and the reactor solvent-washed to remove the agglomerated rubber deposited within it.

After thoroughly washing the reactor to clean it, an attempt was made to restart it under the same conditions with pure methyl chloride for Feed 2 so there was no stabilizer precursor being fed. Polymerization initiated well but as slurry concentration began to build in the reactor, the effluent became very thick and rapid fouling ensued. Within less than an hour, long before a steady-state had been achieved, the reactor was completely fouled out and plugged again. Clearly this reactor cannot operate at such a high slurry concentration without a stabilizer present and the great benefits of VBC-capped polystyrene as a slurry stabilizer precursor in a continuous butyl reactor are evident.

In Example 11 C, a styrene/vinyl benzyl chloride copolymer produced by radical polymerization was used as stabilizer precursor. This functional polystyrene was prepared by radically polymerizing a 54.8% monomer (styrene plus vinyl benzyl chloride) in toluene feed containing 1.0% vinyl benzyl chloride on monomers to 48.2% conversion at 80° C. with AZBN as the initiator. The functional styrene copolymer produced had an $\overline{M}v$ of 42,000 and contained 0.31% chlorine due to the co-polymerized vinyl benzyl chloride. It was dissolved in methyl chloride to yield a 2.35% solution of the functional polystyrene in methyl chloride as a feed to the reactor. The feeds to the reactor for this example were:

Feed 1 was 77.4% monomers, consisting of 2.65% isoprene and 97.35% isobutylene, in methyl chloride and was fed into the bottom draft tube of the reactor (up the propellor shaft) at a rate of 49.9 grams per minute.

Feed 2 was 2.35% of the styrene/vinyl benzyl chloride copolymer stabilizer precursor in methyl chloride. It was metered, chilled, and then blended with chilled Feed 1 and fed into the reactor at a rate of 23 grams per minute.

Feed 3 was the catalyst stream consisting of 0.28% $AlCl_3$ in methyl chloride and it was fed into the top annulus of the reactor at a rate of 10.7 grams per minute.

Feed 4 was pure methyl chloride and was metered, chilled, and then blended with Feeds 1 and 2 and fed into the reactor at a rate of 42.0 grams per minute. Total feed in grams per minute, to the reactor then were:

| Isoprene | 1.02 |
|---|---|
| Isobutylene | 37.60 |
| Methyl Chloride | 85.91 |
| Radical Styrene/Vinyl Benzyl Chloride Copolymer | 0.54 |
| $AlCl_3$ | 0.03 |
| Total | 125.1 |

The stabilizer precursor level was 1.4% on monomers.

At steady-state the reactor effluent was a 30.0% slurry of butyl rubber in methyl chloride plus unreacted monomers. The reactor effluent consisted of:

```
37.53 grams Butyl Rubber
 1.09 grams Monomers
85.91 grams Methyl Chloride
 0.54 grams Polystyrene (partly bound to butyl)
 0.03 grams AlCl₃
125.1 grams Total
```

Reactor temperature was controlled at −93° C. and the effluent was a smoothly flowing, yellow tinted, nonfouling very fine dispersion of butyl rubber particles which turned white upon quenching. Conversion of monomers to butyl was 97.2% and the reactor was operating smoothly producing a stable slurry with no evidences of fouling.

Feed 2 to the reactor was then simply replaced with a pure methyl chloride stream so that feed to the reactor remained unchanged except that no functional polystyrene stabilizer precursor was being fed. As in Example 11 B, within a few minutes the reactor effluent became coarser and thickened and very rapid reactor fouling commenced. Within 15 minutes the reactor had warmed and plugged—the stirrer was jammed and the reactor was full of agglomerated slurry. The run had to be stopped and the reactor warmed and solvent-washed to dissolve the butyl rubber deposited in it. This experiment again demonstrates the effectiveness of a stabilizer in improving butyl reactor performance and enabling the benefits cited in this invention to be realized. With the stabilizer present, the reactor could be operated at more than double the slurry concentration possible without it.

These experiments in the continuous pilot unit butyl reactor have shown that the stabilizers which were effective in the batch dry box runs are also effective in a continuous reactor and make it practical to achieve on a commercial scale all of the benefits noted in this invention for the use of slurry stabilizers in the production of butyl rubber.

What is claimed is:

1. A method of stabilizing a polymerization slurry against agglomeration, the slurry being formed in a cationic Lewis Acid catalyzed polymerization process, and containing as product polymers, polymerized $C_4$–$C_7$ isoolefin homopolymers or butyl rubber copolymers in a polymerization diluent selected from the group consisting of methyl chloride, methylene chloride, vinyl chloride or ethyl chloride diluents, which comprises incorporating into the reaction mixture, the reaction mixture containing monomers, catalyst and diluent, or into the polymerization product slurry about 0.05% to 20% by weight, based upon the weight of product polymers, of a stabilizing agent, the stabilizing agent being (i) a preformed copolymer having a lyophilic, polymerization diluent soluble portion and a lyophobic polymerization diluent insoluble portion, the lyophobic portion being soluble in or adsorbable by the product polymer and the stabilizing agent being capable of forming an adsorbed solubilized polymer coating around the precipitated isoolefin homopolymer or butyl copolymer to stabilize the slurry, provided that the stabilizing agent, when incorporated into the reaction mixture, is free of cationically active unsaturation or functional groups, or (ii) an in situ formed stabilizing agent copolymer formed from a stabilizer precursor, the stabilizer precursor being a lyophilic polymer containing a functional group capable of copolymerizing or forming a chemical bond with the product polymer, the functional group being a cationically active halogen or cationically active unsaturation, the lyophobic portion of the stabilizing agent being product polymer, the stabilizing agent so formed being capable of forming an adsorbed solubilized polymer coating around the precipitated product polymer to stabilize the product polymer slurry.

2. The method of claim 1 wherein the diluent is methyl chloride.

3. The method of claim 1 wherein the product polymer is butyl rubber or polyisobutylene homopolymer.

4. The method of claim 3 wherein the product polymer is isobutylene-isoprene butyl rubber having a viscosity average molecular weight of about 100,000 to 800,000.

5. The method of claim 3 wherein the isobutylene-isoprene butyl rubber has a viscosity average molecular weight of about 250,000 to about 600,000 and the diluent is methyl chloride.

6. The method of claim 1 wherein the stabilizing agent is the preformed copolymer.

7. The method of claim 6 wherein the lyophilic portion of the preformed copolymer is a member of the group consisting of polystyrene, polyvinyl chloride, polyvinyl bromide, neoprene and mono-, di- and trisubstituted polystyrenes, the substituents being halogen or $C_1$–$C_5$ alkyl groups, the lyophilic portion having a degree of polymerization of from about 20 to about 6,000.

8. The method of claim 7 wherein the lyophobic portion of the preformed copolymer is a member of the group of polymerized $C_4$–$C_7$ isoolefins, butyl rubber copolymers, polybutadiene, polyisoprene, ethylenepropylene copolymers, EPDM terpolymers, hydrogenated diene polymers, styrene/butadiene random copolymers of low styrene content (SBR rubbers), and polydimethyl silicone, the lyophobic portion having a degree of polymerization of at least about 10.

9. The method of claim 6 wherein the diluent is methyl chloride.

10. The method of claim 1 wherein the in situ stabilizing agent formed from the stabilizer precursor is employed.

11. The method of claim 10 wherein the lyophilic stabilizer precursor contains cationically active pendant or enchained halogen.

12. The method of claim 11 wherein the lyophile is polystyrene and the halogen is chlorine.

13. The method of claim 12 wherein the lyophile is prepared by free radical polymerization of styrene in the presence of carbon tetrachloride or by copolymerization of styrene with vinyl benzyl chloride.

14. The method of claim 10 wherein the lyophile is polystyrene containing cationically active unsaturation.

15. The method of claim 14 wherein the lyophilic styrene polymer is prepared by anionically polymerizing styrene and capping it with vinyl benzyl chloride or methallyl chloride.

16. The method of claim 10 wherein the stabilizer precursor is a functional polystyrene having a number average molecular weight of from about 5,000 to 150,000.

17. The method of claim 10 wherein the product polymer is isobutylene-isoprene butyl rubber having a viscosity average molecular weight of about 100,000 to 800,000.

18. The method of claim 17 wherein the catalyst is $AlCl_3$ the diluent is methyl chloride, and the butyl rubber has a viscosity average molecular weight of about 250,000 to 600,000.

19. The method of claim 10 wherein the product polymer is polyisobutylene homopolymer.

20. The method of claim 19 wherein the catalyst is AlCl$_3$ and the diluent is methyl chloride.

21. A stabilized slurry produced by the method of claim 1.

22. A stabilized slurry produced by the method of claim 3.

23. A stabilized slurry produced by the method of claim 3 wherein the diluent is methyl chloride.

24. A stabilized slurry produced according to the method of claim 10.

25. A stabilized slurry produced according to the method of claim 18.

26. A stabilized slurry produced according to the method of claim 20.

27. A method of preparing non-agglomerating homopolymers of C$_4$–C$_7$ isoolefins or butyl rubber copolymers by Lewis Acid cationic polymerization of corresponding monomers at temperatures from about $-90°$ C. to about $-20°$ C. in a polymerization slurry diluent selected from the group consisting of methyl chloride, methylene chloride, vinyl chloride and ethyl chloride diluents in the presence of a stabilizer copolymer, the stabilizer copolymer being either (i) a preformed copolymer having a lyophilic diluent soluble portion and a lyophobic diluent insoluble but isoolefin or butyl rubber soluble or adsorbable portion, the preformed stabilizer being free of cationically active unsaturation or functional groups or (ii) an in situ formed stabilizer copolymer formed from a stabilizer precursor being a lyophilic polymer containing a functional group capable of copolymerizing or forming a chemical bond with the isoolefin homopolymer or butyl rubber copolymer, the functional group being cationically active halogen or cationically active unsaturation.

28. The method of claim 27 wherein the butyl rubber is isobutylene-isoprene butyl rubber, the Lewis Acid catalyst is AlCl$_3$ and the diluent is methyl chloride.

29. The method of claim 27 wherein the stabilizer is the in situ formed stabilizer.

30. The method of claim 29 wherein the functional lyophile is a functional styrene polymer stabilizer precursor.

31. The method of claim 27 wherein the isoolefin homopolymer is polyisobutylene, the catalyst is AlCl$_3$ and the diluent is methyl chloride.

32. The method of claim 27 in which the slurry contains up to about 50% by weight butyl rubber copolymer or isoolefin homopolymer.

33. The product produced by the method of claim 32 wherein the butyl rubber is isobutylene-isoprene butyl rubber and the diluent is methyl chloride.

34. The product produced by the method of claim 32 wherein the isoolefin homopolymer is polyisobutylene and the diluent is methyl chloride.

* * * * *